US012651471B2

(12) United States Patent (10) Patent No.: US 12,651,471 B2
Modem et al. (45) Date of Patent: Jun. 9, 2026

(54) DOCUMENT ANNOTATION PROCESSING

(71) Applicant: INTERNATIONAL BUSINESS MACHINES CORPORATION, Armonk, NY (US)

(72) Inventors: Nikhil Modem, Surbiton (GB); Matthew Perryman, Wimborne (GB); Yasmin Tiyamiyu, London (GB); Matthew James Buchan, Oxford (GB)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 18/364,493

(22) Filed: Aug. 3, 2023

(65) Prior Publication Data

US 2024/0404304 A1 Dec. 5, 2024

(30) Foreign Application Priority Data

Jun. 5, 2023 (GB) ...................................... 2308357

(51) Int. Cl.
*G06V 20/70* (2022.01)
*G06V 30/19* (2022.01)
*G06V 30/414* (2022.01)

(52) U.S. Cl.
CPC ........ *G06V 20/70* (2022.01); *G06V 30/19173* (2022.01); *G06V 30/1918* (2022.01); *G06V 30/414* (2022.01)

(58) Field of Classification Search
CPC ............. G06V 30/414; G06V 30/1918; G06V 30/19173; G06V 20/70; G06F 40/169; G06F 40/174
See application file for complete search history.

(56) References Cited

U.S. PATENT DOCUMENTS 8,935,265 B2 * 1/2015 Tang ..................... G06F 40/169
707/754
9,436,665 B2 9/2016 Pircher
9,934,212 B2 4/2018 Arputharaj
(Continued)

FOREIGN PATENT DOCUMENTS

GB 2630746 A 12/2024

OTHER PUBLICATIONS https://apps.apple.com/us/app/nebo-notes-pdf-annotations/ id1119601770, "Nebo Note-taking", App Store Preview, MyScript, Copyright © 2023 Apple Inc, 4 pages.
(Continued)

*Primary Examiner* — Daniel G Mariam
(74) *Attorney, Agent, or Firm* — Anthony Curro

(57) ABSTRACT

A method, computer program product, and computer system are provided for document annotation processing. The method includes: providing a target document in a digital format; receiving an image of an annotated hard copy of the target document and extracting annotations from the image as an annotation source; processing the extracted annotations to collect extracted annotation information metadata for the image; merging the extracted annotation information metadata for the image with other extracted annotation information metadata from other annotation sources for the target document to generate master annotation metadata; and providing the master annotation metadata for application to the target document.

19 Claims, 5 Drawing Sheets

(56)                    References Cited

U.S. PATENT DOCUMENTS

| | | | |
|---|---|---|---|
| 10,007,650 B2 | 6/2018 | Edala | |
| 10,353,997 B1 | 7/2019 | Tobias | |
| 2002/0102022 A1* | 8/2002 | Ma | G06V 30/413 |
| | | | 382/284 |
| 2004/0139391 A1* | 7/2004 | Stumbo | G06F 40/171 |
| | | | 715/230 |
| 2009/0249291 A1 | 10/2009 | Bak | |
| 2012/0060082 A1* | 3/2012 | Edala | G06F 40/169 |
| | | | 715/231 |
| 2024/0330605 A1* | 10/2024 | Hunn | H04L 9/3247 |

OTHER PUBLICATIONS https://lens.google/, "Google Lens", Google Lens—Search What You See, Accessed on Jul. 13, 2023, 7 pages.
https://support.apple.com/en-us/HT208459, "Draw, annotate, and use Scribble in Pages, Numbers, and Keynote", Accessed on Jul. 14, 2023, 5 pages.
https://www.liquidtext.net/, "Better than paper.", LiquidText—"PDF Editor with Superpowers" FastCompany, Accessed on Jul. 13, 2023, 13 pages.

\* cited by examiner

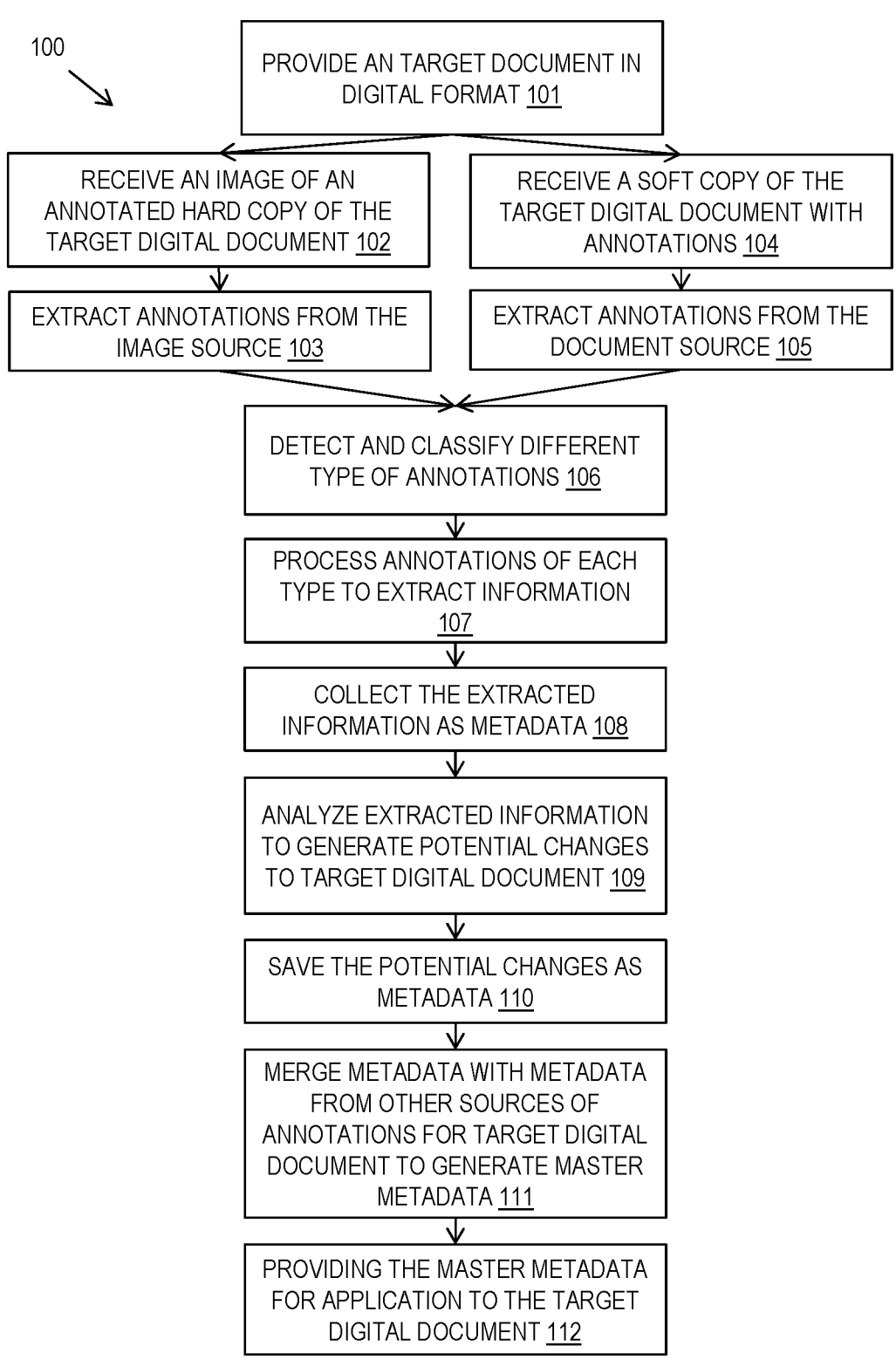

100

PROVIDE AN TARGET DOCUMENT IN DIGITAL FORMAT 101

RECEIVE AN IMAGE OF AN ANNOTATED HARD COPY OF THE TARGET DIGITAL DOCUMENT 102

RECEIVE A SOFT COPY OF THE TARGET DIGITAL DOCUMENT WITH ANNOTATIONS 104

EXTRACT ANNOTATIONS FROM THE IMAGE SOURCE 103

EXTRACT ANNOTATIONS FROM THE DOCUMENT SOURCE 105

DETECT AND CLASSIFY DIFFERENT TYPE OF ANNOTATIONS 106

PROCESS ANNOTATIONS OF EACH TYPE TO EXTRACT INFORMATION 107

COLLECT THE EXTRACTED INFORMATION AS METADATA 108

ANALYZE EXTRACTED INFORMATION TO GENERATE POTENTIAL CHANGES TO TARGET DIGITAL DOCUMENT 109

SAVE THE POTENTIAL CHANGES AS METADATA 110

MERGE METADATA WITH METADATA FROM OTHER SOURCES OF ANNOTATIONS FOR TARGET DIGITAL DOCUMENT TO GENERATE MASTER METADATA 111

PROVIDING THE MASTER METADATA FOR APPLICATION TO THE TARGET DIGITAL DOCUMENT 112

*FIG. 1*

300
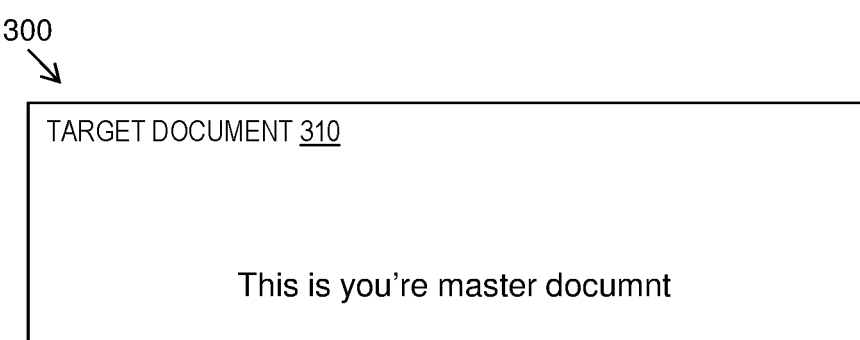
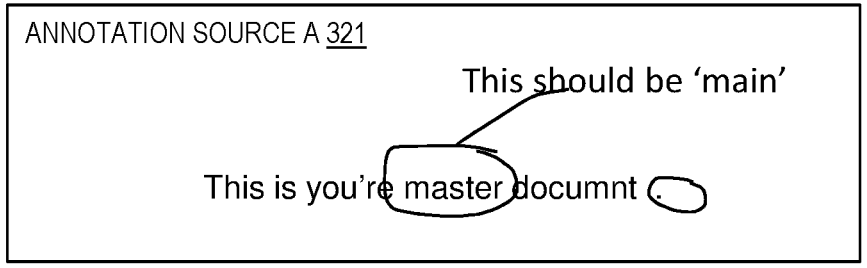
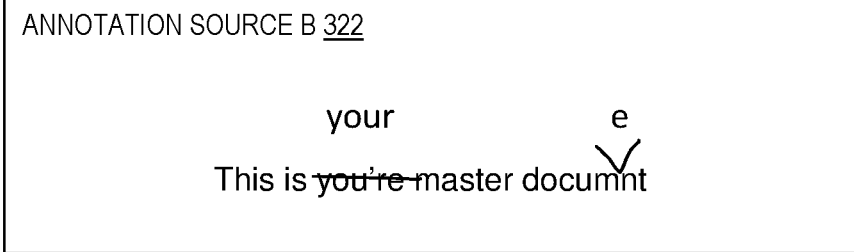
OUTPUT DOCUMENT 330
This is your main document.
*FIG. 3*

DOCUMENT ANNOTATION PROCESSING

BACKGROUND

The present invention relates to annotation of documents, and more specifically, to document annotation processing.

Currently documents are handled in both physical (hard copy) and digital (soft copy) formats. During collaborative work on documents, many versions are produced through edits and annotations which should eventually be merged into a master document.

Managing the latest version of these documents is an easy task when edits are made entirely on soft copies. For example, this may be by utilizing technologies that allow concurrent access to the document so editors can directly modify the original document and there is no need for merging.

Some members of a collaborative effort may prefer to read through, make annotations and comments using a physical hard copy of the document and those changes need to be transferred back to the digital soft copy. With existing technologies, the transfer of annotations from a hard copy to a soft copy is largely manual. Furthermore, the technology required to make edits to the document in a purely digital realm may not be accessible to all members.

SUMMARY

According to an embodiment of the present invention there is provided a computer-implemented method for document annotation processing, said method comprising: providing a target document in a digital format; receiving an image of an annotated hard copy of the target document and extracting annotations from the image as an annotation source; processing the extracted annotations to collect extracted annotation information metadata for the image; merging the extracted annotation information metadata for the image with other extracted annotation information metadata from other annotation sources for the target document to generate master annotation metadata; and providing the master annotation metadata for application to the target document.

According to another embodiment of the present invention there is provided system for document annotation processing, comprising: a processor and a memory configured to provide computer program instructions to the processor to execute the function of the components: a target document component for providing a target document in a digital format; an image annotation extraction component for receiving an image of an annotated hard copy of the target document and extracting annotations from the image as an annotation source; an annotation processing component for processing the extracted annotations to collect extracted annotation information metadata for the image; an annotation merging component for merging the extracted annotation information metadata for the image with other extracted annotation information metadata from other annotation sources for the target document to generate master annotation metadata; and a master metadata component for providing the master annotation metadata for application to the target document.

According to a further embodiment of the present invention there is provided computer program product for document annotation processing, the computer program product comprising a computer readable storage medium having program instructions embodied therewith, the program instructions executable by a processor to cause the processor to: provide a target document in a digital format; receive an image of an annotated hard copy of the target document and extracting annotations from the image as an annotation source; process the extracted annotations to collect extracted annotation information metadata for the image; merge the extracted annotation information metadata for the image with other extracted annotation information metadata from other annotation sources for the target document to generate master annotation metadata; and provide the master annotation metadata for application to the target document.

The computer readable storage medium may be a non-transitory computer readable storage medium and the computer readable program code may be executable by a processing circuit.

BRIEF DESCRIPTION OF THE DRAWINGS

Embodiments of the present invention will now be described, by way of example only, with reference to the accompanying drawings:

FIG. 1 is a flow diagram of an example embodiment of a method in accordance with embodiments of the present invention;

FIG. 3 is a schematic diagram of an example of annotations in accordance with embodiments of the present invention;

Figure 2:
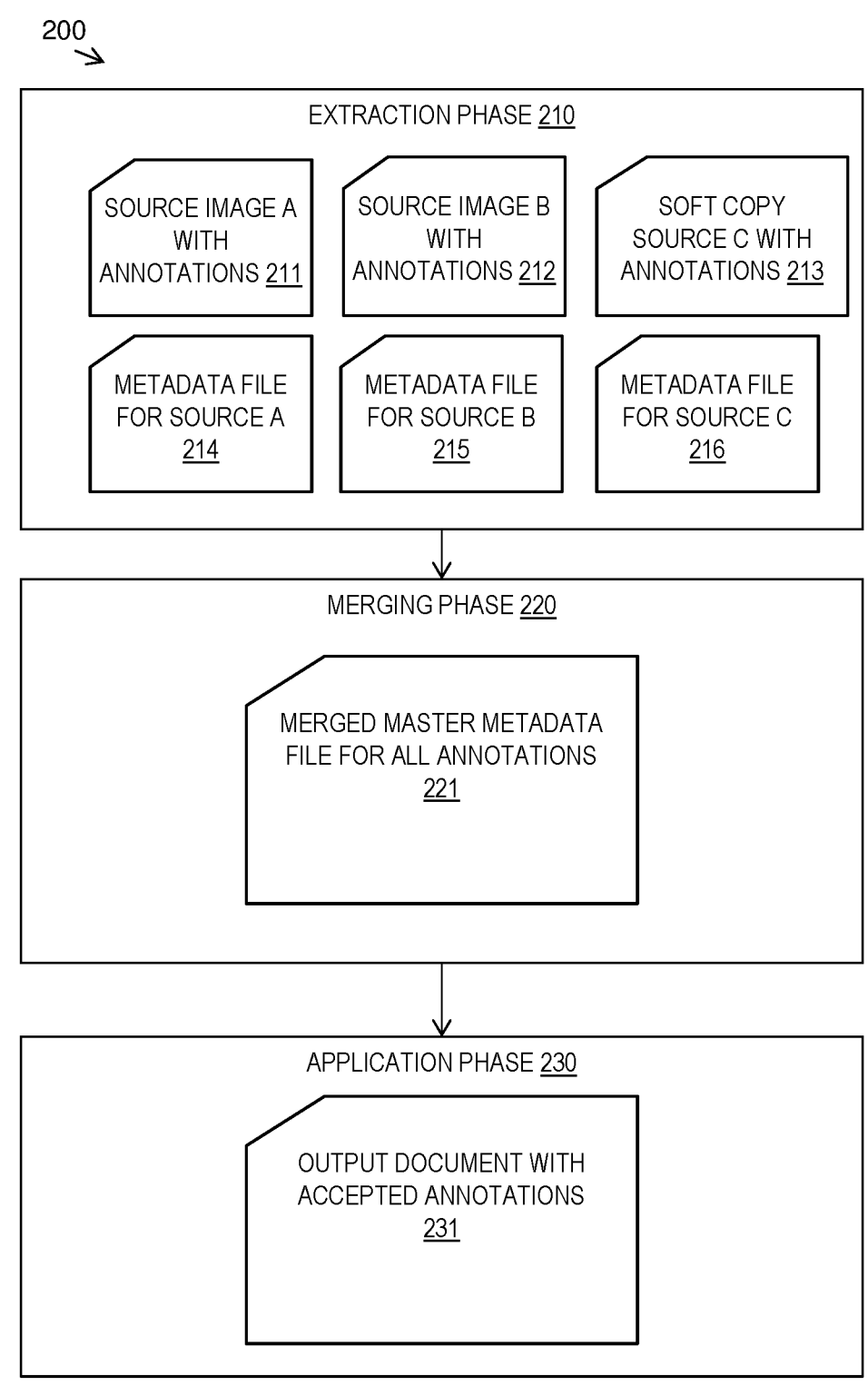
FIG. 2 is a schematic flow diagram of an example embodiment of main phases of a method in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a method, system, and computer program product are provided for document annotation processing. The document annotation processing merges and provides annotations of a target document from multiple reviewers. A computer-implemented method includes providing a target document in a digital format where the target document may be a collaborative document for which annotations are received in the form of edits and comments from multiple reviewers.

At least some of the reviewers may provide comments in the form of manual annotations of a hard copy of the target document with an image of the annotated hard copy provided. Other reviewers may provide annotations on a soft copy of the target document. The annotations on a soft copy may be in the form of typed edits. Additionally or alternatively the annotation on a soft copy may be in the form of edits and annotations using a digital pen or other means of writing on a soft copy of a document.

The method and system of document annotation processing are an improvement in the technical field of image processing and document processing.

Referring to FIG. 1, a flow diagram 100 shows an example embodiment of a computer-implemented method for document annotation processing. The method may be carried out by a collaborative document annotation system for processing annotations of a target document with the annotations received from multiple sources.

The method provides 101 a target document in a digital format. The target document may be, most commonly, a document including typed text and/or numbers. For example, this may be an editable text document, a presentation including text, a spreadsheet, etc. The document may include other elements, such as inserted images, graphs, etc.

The method receives annotation sources in the form of one or more copies of the target document with annotations. The sources may include at least one image of an annotated hard copy of the target document. The sources may include at least one annotated soft copy of the target document.

The method may receive 102 one or more images of an annotated hard copy of the target document with the image being an annotation source. Hard copy versions of the original target digital document may be printed out and edited with annotations by one or more reviewers. Once the annotation process is complete, the reviewers may then scan or photograph the annotated hard copies and upload these to the system. The images may be uploaded to the same directory as the target document in a storage medium.

The method may extract 103 annotations from the image. This extraction may include digital analysis of the image to identify locations and content of manual annotations. This may include handwriting to text conversion techniques. This may also include Optical Character Recognition (OCR) for identifying individual characters and/or Intelligent Word Recognition (IWR) for identifying whole words. This may further include computer vision modelling and image analysis.

The method may also receive 104 one or more soft copies of the target document with annotations with the annotated soft copies being additional collaborative annotation sources. The method may extract 105 annotations from the annotated soft copies. This may be carried out by a digital comparison with the target document to identify edits and comments.

The extracted annotations from each source are processed to collect 108 extracted annotation information metadata for each source. A metadata file may be provided for each source, such as a received image source or a received soft copy source, with the metadata file for a source containing all the annotation metadata extracted from that source.

The processing may include detecting and classifying 106 different categories of types of annotations and processing each type of annotations to collect extracted annotation information metadata. The method may process 107 each type of annotation to extract information. The categories of the annotations may include: modifications directly to the original text; text alone in a margin; text in a margin with some indication of connection to a part of the original text; text relating to the target document as a whole, and hand drawn diagrams. Annotations that cannot be classified as belonging to a category of annotation may be collected under a general comments category. Processing the extracted annotations of the categories may include interpreting the syntax and semantics of annotations and/or symbols included in the annotations. The processing may also include interpreting location context of the annotations.

Processing the extracted annotations may include generating bounding boxes of annotations and combining neighboring boxes of same category annotations for analysis.

Processing the extracted annotations may include placing annotations in the target document by determining a position relative to text of the target document. Processing the extracted annotations may include converting annotations in the form of diagrams to web-based vector images and the collected extracted annotation information metadata includes links to the web-based vector images. Processing the extracted annotations may include identifying general or un-categorized annotations and providing these in a general field in the annotation information metadata.

Processing the extracted annotations may include analyzing 109 the extracted annotations to generate potential changes to the target document. After analyzing the positions and meanings of comments, the method may generate potential changes to the original text that the comments may be suggesting. The potential changes may be saved 110 with the annotation information metadata, for example, in the metadata file for the annotation source.

The extracted annotation information metadata of generated potential changes to the target document may include a position in the target document and subtractions and additions to the target document. Analyzing the extracted annotations to generate potential changes to the target document may include using a generative machine learning model or large language model to suggest changes to the target document.

The annotation information metadata for a source including the potential changes may have a format including for a portion of the text of the target document: an identification of the portion of the text; subtractions of the portion of the text with a position in the portion of the text; additions to the portion of the text with a position and with the inserted value; and, optionally, a comment included in the annotation relating to the portion of the text. The annotation information metadata for a source may also include a section for general comments that are either related to the entire target document or are not clearly defined as belonging to a portion of the text. The general comments may include text and/or diagrams.

The method may merge 111 the extracted annotation information metadata for the image with other extracted annotation information metadata from other annotation sources for the target document to generate master annotation metadata. Merging the extracted annotation information metadata for the image with other extracted annotation information metadata from other annotation sources may merge annotation metadata from sources for a portion of the target document where the annotations do not differ by more than a predefined limit.

When a metadata file is saved for an annotation source, if existing metadata files are present in the directory belonging to the same target document, a metadata file merge is carried out to output a single master metadata file of all annotators' changes. The result is a digital document with modifications extracted from all the annotations made from all the editors ready to be applied to the original soft copy target document.

The master annotation metadata may have a format including annotation information metadata of all sources for each portion of original text of the target document. This may include all the annotation information metadata from the sources for a portion of the text of the target document: an identification of the portion of the text; subtractions of the portion of the text with a position in the portion of the text; additions to the portion of the text with a position and with the inserted value; and, optionally, comments included in the annotation relating to the portion of the text. The master annotation metadata may also include general annotation information that relates to the overall target document as gathered from the source documents.

The method may provide 112 the master annotation metadata for application to the target document. This may include providing the master annotation metadata file. A downstream application may extract information from the master metadata file, which may be presented to the user with all the changes to choose from.

Referring to FIG. 2, a schematic flow diagram 200 illustrates an example embodiment of the described method. The method includes three phases. An extraction phase 210 extracts annotation metadata from each annotation source for a target document. In the illustrated example, the following annotation sources are shown. A source image A 211 with annotations is processed to extract a metadata file 214 for source A. A source image B 212 with annotations is processed to extract a metadata file 215 for source B. Additionally, a soft copy source C 213 with annotations is processed to extract a metadata file 216 for source C.

A merging phase 220 combines the metadata files 214, 215, 216 of the sources. The metadata files 214, 215, 216 may be added to a directory for the target document and may be merged as additional annotation metadata files are added to the directory. A merged master metadata file 221 is generated for all the annotations from the sources.

An application phase 230 outputs the target document 231 with all accepted annotations.

Referring to FIG. 3, a schematic diagram 300 shows an example extract of a target document 310 is shown with the text "This is you're master document". Annotations from source A 321 include a circling of the word "master" with the comment "This should be 'main'" and an added punctuation full stop that is also circled. Annotations from source B 322 cross out the word "you're" and write "your" above it and also indicate that an "e" should be added to the word "document" using an insertion symbol. The output document 330 includes all the corrections.

The metadata file for the annotation source A 321 may be as follows:

```
text_blocks:
1:
    original_text: "This is you're master documnt"
    subtractions:
        1:
            [16:22]
            comment:1
    additions:
        1:
            [16]
            value: "main"
            comment: 1
        2:
            [30]
            value: "."
    comments:
        1: "This should be 'main'"
```

In the above, the metadata in the subtractions of [16:22] indicates that positions 16 to 22 in the original text that denote "master" are subtracted. The metadata in the addition indicates that at position [16], the word "main" is inserted as explained in the comment.

The metadata file for annotation source B 322 may be as follows:

```
text_blocks:
1:
    original_text: "This is you're master documnt"
    subtractions:
        1:
            [12:13]
        2:
            [14:15]
    additions:
        1:
            [28]
            value: "e"
    comments:
```

In the above, the metadata in the subtractions of [12:13] and [14:15] indicates that the "'" and the "e" in "you're" are subtracted to leave "your". The square brackets indicate the start index (inclusive) and the end index (exclusive).

The merged metadata file for all annotations may be as follows:

```
text_blocks:
1:
    original_text: "This is you're master documnt"
    subtractions:
        1:
            [16:22]
            comment:1
        2:
            [12:13]
        3:
            [14:15]
    additions:
        1:
            [16]
            value: "main"
            comment: 1
        1:
            [28]
            value: "e"
        2:
            [30]
            value: "."
    comments:
        1: "This should be 'main'"
```

In an example scenario, a document is printed out and the hard copies are annotated by one or more reviewers. All hard copies of the document are then photographed or scanned and placed in the same directory as the original soft copy document.

A user may then run an application to extract the contents of the images. An example of the extraction process outputting a metadata file and handling multiple concurrent annotation metadata files is outlined below:

Four main annotation categories are used:

modifications directly to the original text (strikeouts, grammar and punctuation changes, spelling, highlights);

text in the margin alone;

text in the margin with some indication of connection to a part of the original text (arrows, lines, curly brackets, underline, circling); and hand drawn diagrams.

For each annotation image the following may be undertaken. A metadata file may be created unique to this image. Categories of text and drawings are detected with a computer vision model to output bounding boxes around each line of text or drawing and its category. The computer vision model may be a simple classifier that takes in images and outputs a set of predetermined categories. The computer vision processing is used to help generate the metadata. The computer vision model may be in the form of a Convolutional Neural Network (CNN) that is be trained on a dataset comprising of examples of the various categories of annotations. The computer vision model may also be trained to on a dataset of images relating to the annotation categories. For example, the CNN may be trained on various arrows, circles and lines and then be able to detect these as relating to the categories. The CNN may be trained on different types and categories of annotations. The content of the bounding boxes may be interpreted using OCR and/or IWR. The original text and annotations are written to a metadata file as an annotation output.

The above steps may include the following processing.

Boxes of neighboring lines of text of the same category may be combined, forming paragraphs. The paragraphs may be written to the metadata file as blocks of human-readable data-serialization language. For example, YAML blocks may be used. YAML is a human-readable data-serialization language for all programming languages which has a minimal syntax but uses the same communications application as Extensible Markup Language (XML).

For comments linked to the original text via a hand-drawn connection (for example, an arrow, a line, etc.), the comment's contents may be written to the YAML paragraphs comments section. Language models may be used to generate potential changes to the target document based on the comments. For example, a generative machine learning model may be used to analyze comments to suggest alterations to original text. In another example, suggested potential changes to the original text of the target document may be generated using artificial intelligence chatbots built on large language models.

High probability suggestions are added to additions and subtractions on the paragraph with the comment's number in the actions comment field.

Non-linked comments may be written to the metadata file as stand-alone comments with their approximate location recorded in the target document.

Expressions may be added to the YAML blocks of text to show direct modifications.

Objects and comments of the annotations may be placed in the target document. The placing may determine the adjacent printed line to the center of the bounding box and the corresponding line in the metadata file may be identified. An objects section may be added to the paragraph referencing the SVG or comment number. This will be used in the merge with the original document to place the image or comment. If the SVG/comment is above, below, or between blocks of text, the closest line vertically may be recorded.

The remaining hand-drawn diagrams may be converted to Scalable Vector Graphics (SVG) objects as a web-based vector image defining two-dimensional graphics. The SVG objects may be saved to the directory, with an appended image link and location data to the metadata file.

If more than one annotation metadata file exists in the current directory the metadata files are merged as follows.

If a second file is found for the same target document, for each paragraph the following is carried out. If any text block differs between files by more than a predefined limit, exit paragraph with an error. This issue could be caused by incorrect word detection when scanning the hard copy or when the printed text of the two documents are of different versions. Otherwise, the annotations on each text block are merged, outputting to a new metadata file. An error is raised if changes conflict.

The individual source metadata files are deleted leaving a single output merged master metadata file.

An embodiment of a process that a downstream application may undergo to apply metadata file annotations to the target digital document is detailed below:

When applying a metadata file to the target document, an annotation applying system will open the target document. All changes to the document are made under a 'review' equivalent flag for that document.

The original text may be parsed in the metadata file as follows:

At words that differ between the document and metadata file, replace the metadata file version unless the number of words exceeds a predefined limit. At the limit, stop the application and raise a document incompatible error.

For expressions signifying a change to text, add the change to the target document.

For comment links, create a new comment in the document to the point in the original text. Add the comment text from the metadata file.

At links to SVG images, import the link to the image in the document.

Exit loop at end of printed text.

Add each comment not linked to printed text as a comment or as a text box placed with metadata locational information.

Figure 4:
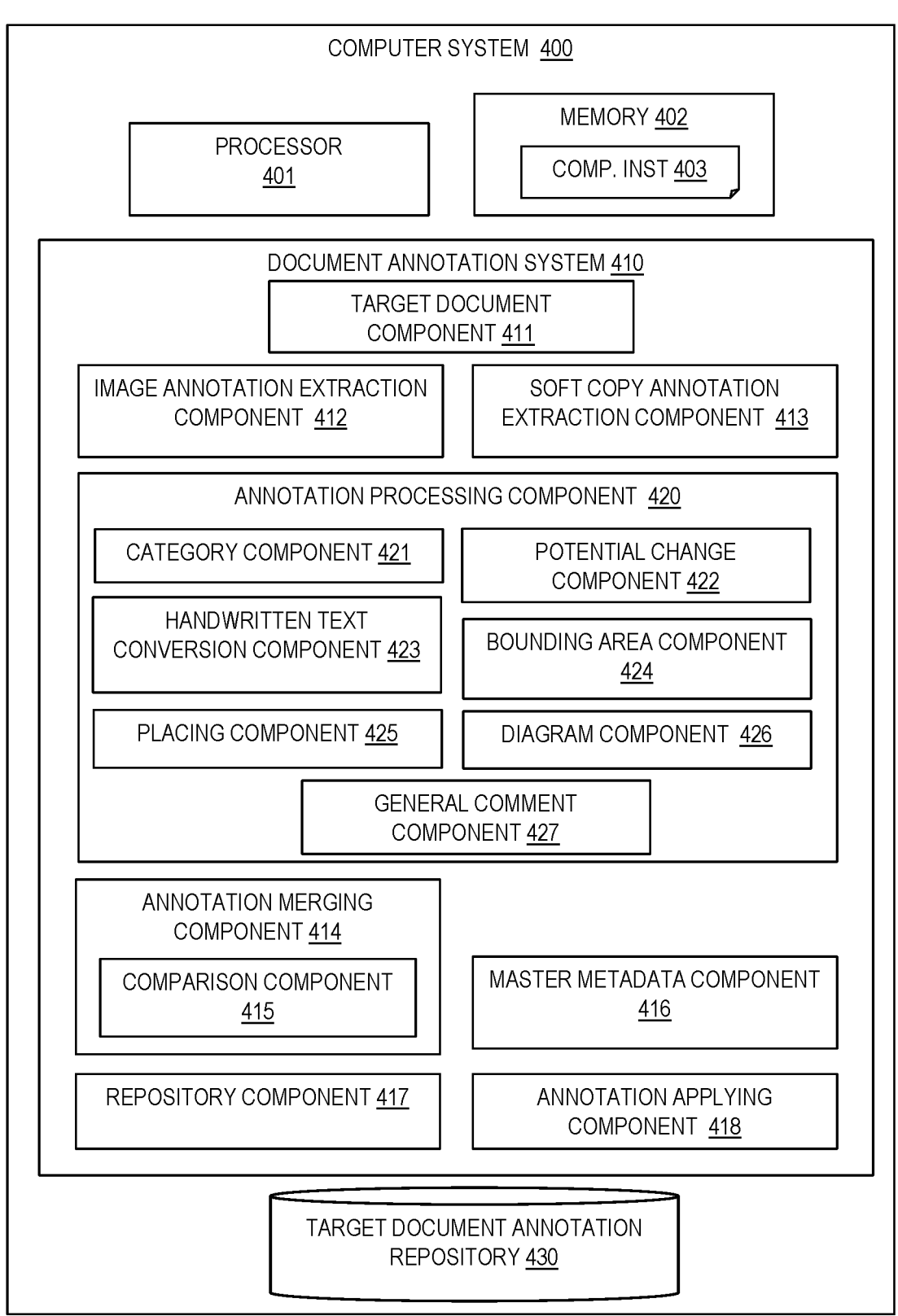
FIG. 4 is block diagram of an example embodiment of a system in accordance with embodiments of the present invention.

Referring to FIG. 4, a computer system 400 is shown in which an example embodiment of the described document annotation system 410 may be provided. The computer system 400 may include at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The document annotation system 410 may include a target document component 411 for providing a target document in a digital format. The document annotation system 410 may include an image annotation extraction component 412 for receiving an image of an annotated hard copy of the target document and extracting annotations from the image as an annotation source. The document annotation system 410 may include a soft copy annotation extraction component 413 for receiving an annotated soft copy of the target document and extracting annotations from the soft copy.

The document annotation system 410 may include an annotation processing component 420 for processing the extracted annotations to collect extracted annotation information metadata for annotations from annotation sources as extracted from the image annotation extraction component 412 and/or the soft copy annotation extraction component 413.

The annotation processing component 420 may include one or more of the following components. Some of the components may work together to process the annotations. Some of the processing components may use remotely accessed tools for carrying out the processing.

A category component 421 may be provided for detecting and classifying different categories of annotations and processing each type of annotations to collect extracted annotation information metadata;

A potential change component 422 may be provided for analyzing the extracted annotations to generate potential changes to the target document and wherein the collected extracted annotation information metadata includes potential changes to the target document;

A handwritten text converting component 423 may be provided for converting handwritten text of annotations and interpreting the syntax of annotations and/or symbols included in the annotations;

A bounding area component 424 may be provided for generating bounding boxes of annotations and combining neighboring boxes of same category annotations;

A placing component 425 may be provided for placing annotations in the target document by determining a position relative to text of the target document; and A diagram component 426 may be provided for converting annotations in the form of diagrams to web-based vector images and the collected extracted annotation information metadata includes links to the web-based vector images.

A general comment component 427 may be provided for placing general or un-categorized comments in a general section for the target document.

The document annotation system 410 may include an annotation merging component 414 for merging the extracted annotation information metadata for the image with other extracted annotation information metadata from other annotation sources for the target document to generate master annotation metadata. The annotation merging component 414 may include a comparison component 415 for merging annotation metadata from sources for a portion of the target document where the annotations do not differ by more than a predefined limit.

The document annotation system 410 may include a master metadata component 416 for providing the master annotation metadata for application to the target document.

The document annotation system 410 may include a repository component 417 for storing extracted annotation information metadata from a source in a target document annotation repository 430 for a target document for merging with other extracted annotation information metadata from other sources in the repository.

The document annotation system 410 may include an annotation applying component 418 for applying the master annotation metadata to a target document with changes to the target document provided for review by a user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
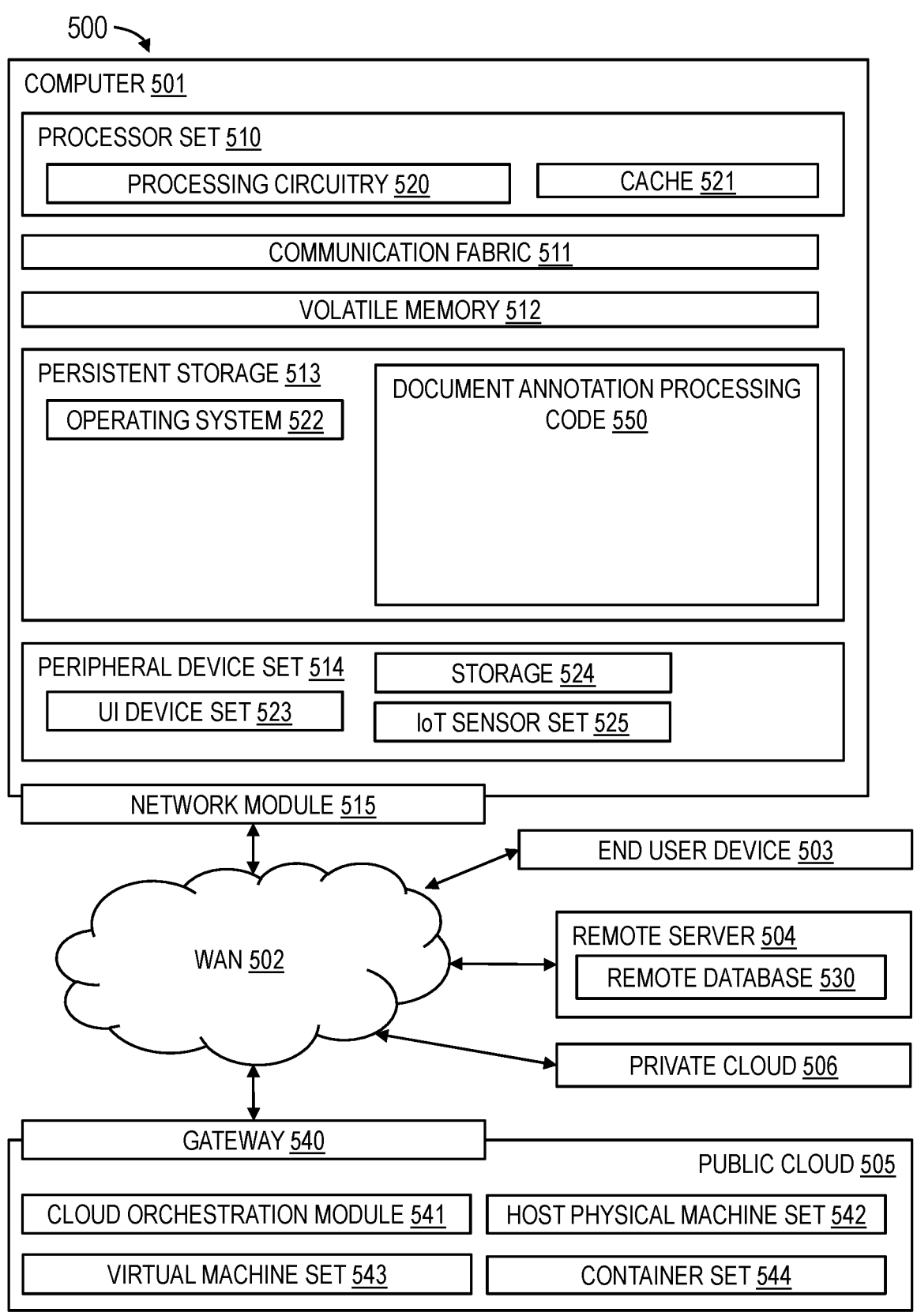
FIG. 5 is a block diagram of an example embodiment of a computing environment for the execution of at least some of the computer code involved in performing the present invention.

Referring to FIG. 5, computing environment 500 contains an example of an environment for the execution of at least some of the computer code involved in performing the inventive methods, such as document annotation processing code 550. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method to improve document processing for document annotation processing, said method comprising:

providing a target document in a digital format;

receiving an image of an annotated hard copy of the target document and extracting handwritten annotations from the image as an annotation source, the handwritten annotations including handwritten text or handwritten drawings;

analyzing the extracted annotations using a generative machine learning model or large language model to collect extracted annotation information metadata for the image of the annotated hard copy of the target document, the extracted annotation information metadata including a location of annotations;

merging the extracted annotation information metadata for the image of the annotated hard copy of the target document with other extracted annotation information metadata from other annotation sources for the target document to generate master annotation metadata; and providing the master annotation metadata for application to the target document, the application to the target document applying edits of the annotated hard copy of the target document to the target document in digital format, wherein processing the extracted annotations includes identifying general or un-categorized annotations and providing these in a general field in the annotation information metadata.

2. The method of claim 1, including:

receiving an annotated soft copy of the target document and extracting annotations from the soft copy; and processing the extracted annotations to collect extracted annotation information metadata for the soft copy as another annotation source.

3. The method of claim 1, wherein processing the extracted annotations includes:

detecting and classifying different categories of annotations and processing each type of annotation to collect extracted annotation information metadata.

4. The method of claim 1, wherein processing the extracted annotations includes:

analyzing the extracted annotations to generate potential changes to the target document and wherein the collected extracted annotation information metadata includes potential changes to the target document.

5. The method of claim 4, wherein the extracted annotation information metadata of generated potential changes to the target document includes a position in the target document and subtractions and additions to the target document.

6. The method of claim 4, wherein analyzing the extracted annotations to generate potential changes to the target document includes using the large language model or the generative machine learning model to suggest changes to the target document.

7. The method of claim 1, wherein processing the extracted annotations includes:

converting handwritten text of annotations and interpreting a syntax of annotations and/or symbols included in the annotations.

8. The method of claim 1, wherein processing the extracted annotations includes:

generating bounding boxes of annotations and combining neighboring boxes of same category annotations.

9. The method of claim 1, wherein processing the extracted annotations includes:

placing annotations in the target document by determining a position relative to text of the target document.

10. The method of claim 1, wherein processing the extracted annotations includes:

converting annotations in the form of diagrams to web-based vector images and the collected extracted annotation information metadata includes links to the web-based vector images.

11. The method of claim 1, wherein the collected extracted annotation information metadata for a source includes one or more of:

a reference to a portion of an original text to which the annotation relates;

a position of the annotation in relation to the target document;

a value of the annotation;

potential changes to the target document;

a comment included in the annotation; and a link to an image object of the annotation.

12. The method of claim 1, wherein merging the extracted annotation information metadata for the image with other extracted annotation information metadata from other annotation sources for the target document to generate master annotation metadata includes:

merging annotation metadata from sources for a portion of the target document where the annotations do not differ by more than a predefined limit.

13. The method of claim 1, including:

storing extracted annotation information metadata from a source in a repository for a target document and merging with other extracted annotation information metadata from other sources in the repository.

14. The method of claim 1, wherein the master annotation metadata has a format including annotation information metadata of all sources for each portion of original text of the target document.

15. The method of claim 1, including:

applying the master annotation metadata to a target document with changes to the target document provided for review by a user.

16. A system to improve document processing for document annotation processing, comprising:

a processor and a memory configured to provide computer program instructions to the processor to execute a function of the components:

a target document component for providing a target document in a digital format;

an image annotation extraction component for receiving an image of an annotated hard copy of the target document and extracting handwritten annotations from the image as an annotation source, the handwritten annotations including handwritten text or handwritten drawings;

an annotation processing component for processing the extracted annotations using a generative machine learning model or large language model to collect extracted annotation information metadata for the image of the annotated hard copy of the target document, the extracted annotation information metadata including a location of annotations;

an annotation merging component for merging the extracted annotation information metadata for the image of the annotated hard copy of the target document with other extracted annotation information metadata from other annotation sources for the target document to generate master annotation metadata; and a master metadata component for providing the master annotation metadata for application to the target document, the application to the target document applying edits of the annotated hard copy of the target document to the target document in digital format, wherein processing the extracted annotations includes converting annotations in the form of diagrams to web-based vector images and the collected extracted information metadata includes links to the web-based vector images.

17. The system of claim 16, including:

a soft copy annotation extraction component for receiving an annotated soft copy of the target document and extracting annotations from the soft copy; and wherein the annotation processing component processes the extracted annotations to collect extracted annotation information metadata for the soft copy as another annotation source.

18. The system of claim 16, wherein the annotation processing component includes one or more of:

a category component for detecting and classifying different categories of annotations and processing each type of annotations to collect extracted annotation information metadata;

a potential change component for analyzing the extracted annotations to generate potential changes to the target document and wherein the collected extracted annotation information metadata includes potential changes to the target document;

a handwritten text converting component for converting handwritten text of annotations and interpreting a syntax of annotations and/or symbols included in the annotations;

a bounding area component for generating bounding boxes of annotations and combining neighboring boxes of same category annotations;

a placing component for placing annotations in the target document by determining a position relative to text of the target document; and a general comment component for placing general or un-categorized comments in a general section for the target document.

19. A computer program product to improve document processing, the computer program product comprising a computer readable storage medium having program instructions embodied therewith, the program instructions executable by a processor to cause the processor to:

provide a target document in a digital format;

receive an image of an annotated hard copy of the target document and extracting handwritten annotations from the image as an annotation source, the handwritten annotations including handwritten text or handwritten drawings;

analyze the extracted annotations using a generative machine learning model or large language model to collect extracted annotation information metadata for the image of the annotated hard copy of the target document, the extracted annotation information metadata including a location of annotations;

merge the extracted annotation information metadata for the image of the annotated hard copy of the target document with other extracted annotation information metadata from other annotation sources for the target document to generate master annotation metadata; and provide the master annotation metadata for application to the target document, the application to the target document applying edits of the annotated hard copy of the target document to the target document in digital format, wherein merging the extracted annotation information metadata for the image with other extracted annotation information metadata from other annotation sources for the target document to generate master annotation metadata includes merging annotation metadata from sources for a portion of the target document where the annotations do not differ by more than a predefined limit.

* * * * *